United States Patent [19]

Carlick et al.

[11] Patent Number: 5,158,606
[45] Date of Patent: Oct. 27, 1992

[54] LOW RUB PRINTING INK

[75] Inventors: Daniel J. Carlick, Livingston, N.J.; Robert W. Bassemir, Jamaica, N.Y.; Ramasamy Krishnan, Sewaren; Richard R. Durand, Jr., Carlstadt, both of N.J.

[73] Assignee: Sun Chemical Corporation, Fort Lee, N.J.

[21] Appl. No.: 665,384

[22] Filed: Mar. 6, 1991

[51] Int. Cl.$^5$ .............................................. C09D 11/06
[52] U.S. Cl. .................................. 524/145; 106/31 R; 106/20 R; 524/270; 524/272; 524/274; 524/414; 524/462; 524/545; 524/548; 524/566; 524/568; 524/575; 524/585
[58] Field of Search ................ 524/322, 475; 523/160, 523/161; 106/30, 27, 20

[56] References Cited

U.S. PATENT DOCUMENTS

| | | | |
|---|---|---|---|
| 3,775,353 | 11/1973 | Kohne et al. | 524/475 |
| 4,469,826 | 9/1984 | Carlick et al. | 523/339 |
| 4,762,568 | 8/1988 | Nakamura et al. | 106/23 |

FOREIGN PATENT DOCUMENTS

| | | |
|---|---|---|
| 6070071 | 6/1981 | Japan . |
| 207686 | 8/1988 | Japan . |

OTHER PUBLICATIONS

Brushed Polystyrene Pigment, Kohne et al.

Primary Examiner—William R. Dixon, Jr.
Assistant Examiner—Margaret V. Einsmann
Attorney, Agent, or Firm—Jack Matalon

[57] ABSTRACT

A printing ink composition having a high degree of rub-off resistance comprising (a) a dispersion of a pigment in a vehicle containing a $C_7$–$C_{40}$ oil and (b) a polymer latex emulsified in said dispersion. When employed for printing at high speeds, an anti-misting compound such as tridecyl acid phosphate, phosphoric acid, glycerol, or propylene carbonate is preferentially added to the ink composition. Where cost is not of paramount concern, a polytetrafluoroethylene wax is preferentially added to the ink composition.

21 Claims, No Drawings

LOW RUB PRINTING INK

The invention relates to printing ink having low rub-off properties. Low rub-off is achieved by emulsifying a polymer latex in a dispersion of a pigment in a vehicle containing a $C_7\text{-}C_{40}$ oil.

BACKGROUND OF THE INVENTION

Inks having low rub-off properties are known in the prior art. Such inks typically contain waxes of various types and the resultant inks will exhibit improved mar-resistance, slip and water repellency properties. Wax of a controlled fine particle size can be mixed or ground into the batch along with pigments or may be introduced during the final blending operations. Alternatively, the wax may be compounded into a "wax media" by dispersing or melting the wax into the varnishes and/or solvents and adding these to the ink.

It is generally well-known that the non-rub qualities imparted by an individual wax are a function of both the particle size and the hardness as well as the melting temperature of any particular wax. However, addition of waxes to inks in order to solve the rub-off problem introduces other problems. Firstly, on a scale of 100 representing no rub-off, waxes added to inks will result in reduction in rub-off to a level of only about 60. Secondly, with the heat and movement imparted by the friction of constant rubbing under pressure, particles of the ink film can ball up and mark unprinted areas. Additionally, the more waxes that are added to improve rub resistance, the more problems are introduced in respect to gloss and hardness characteristics. Addition of waxes to inks almost invariably decreases their gloss. Accordingly, a compromise must be achieved between the desired level of non-rub properties and gloss. Finally, there is the factor of increased cost associated with the ink containing relatively expensive waxes such as microcrystalline waxes and polytetrafluoroethylene waxes. In the case of news inks, cost is an extremely important factor and, therefore, at the present time news inks do not ordinarily contain any waxes; furthermore, waxes provide only minimal reduction of rub-off in news ink formulations.

Synthetic waxes such as polyethylene waxes and polytetrafluoroethylene waxes are now the most popular waxes used in the ink industry. Such waxes are usually added in the form of "non-rub" or "slip" media which are fine dispersions of the wax in the solvents, oils and resins, etc., of the particular type of ink formulation in which it is to be incorporated. Waxes prepared from polytetrafluoroethylene powders are suitable for all types of printing inks, but are especially ideal for heatset inks, where the temperature of the drying apparatus does not cause them to soften or melt. Polytetrafluoroethylene-based waxes can also be stirred into finished inks to improve their rub and scuff resistance. Nevertheless, the relative cost of a polytetrafluoroethylene wax is prohibitively high for many applications, e.g. news inks.

DETAILS OF THE PRESENT INVENTION

It has now been discovered that it is possible to provide a low-rub printing ink composition that overcomes the problems alluded to above without significantly increasing the cost of the ink. Thus, in accordance with the present invention, a printing ink composition is provided which comprises: (a) a dispersion of a pigment in a vehicle containing a $C_7\text{-}C_{40}$ oil and (b) a polymer latex emulsified into said emulsion.

Polymer latices are well-known in the prior art and are commercially available. Typically, a polymer latex will comprise an aqueous suspension of a polymer having a number average molecular weight in the range of about 50,000 to about 10,000,000 or more. The particle size of the polymer will generally range from about 0.02 to 0.25 micron and typically the polymer latex will contain from about 30 to about 60 wt. % polymer solids, based on the weight of the latex.

Suitable polymers for conversion into latices useful for the present invention include styrene-butadiene copolymer, styrene-butadiene-vinylpyridine terpolymer, styrene-butadiene-acrylonitrile terpolymer, polytetrafluoroethylene, polyethylene, polyurethane, polyvinyl acetate, polystyrene, vinyltoluene-butadiene copolymer, butadiene-acrylonitrile copolymer, styrene-acrylic acid copolymer, carboxylated styrene-butadiene copolymer, vinylpyrrolidone-vinyl acetate copolymer, vinyl pyrrolidone-ethyl acrylate copolymer, vinypyrrolidone-styrene copolymer, polyvinylidene chloride, etc.

For the purposes of the present invention, the polymer latex is preferably comprised of styrene-butadiene copolymer, styrene-butadiene-vinylpyridine terpolymer or polytetrafluoroethylene. Generally, the polymer latex will be incorporated in the ink composition in an amount of about 0.5 to about 15 wt. %, preferably 1 to 10 wt. %, and most preferably, 2 to 6 wt. %, based on the weight of the ink composition.

Occasionally, ink misting will occur in respect to printing inks, especially when they are employed for printing at high speeds. In the event that such ink misting is encountered, it may be drastically reduced or eliminated by incorporating a compound which may be selected from the group consisting of (a) an organic acid phosphate ester of a monohydric alcohol, (b) glycerol, (c) propylene carbonate and mixtures thereof. Typically, such compound will be incorporated in the ink composition in an amount of about 0.1 to about 10 wt. %, preferably 0.3 to 3 wt. %, based upon the weight of the composition.

Preferably, the organic acid phosphate ester of a monohydric alcohol is one in which the organic group is a straight or branched chain alkyl, aryl, alkaryl, aralkyl or heterocyclic group containing 2 to 18, preferably 8 to 15, carbon atoms. A preferred type of organic acid phosphate ester of a monohydric alcohol is tridecyl acid phosphate. Alternatively, reduction in misting may be achieved by incorporating phosphoric acid in an amount of about 0.1 to about 1 wt. %, preferably, 0.2 to 0.5 wt. %, in the ink composition.

Where cost is not of paramount consideration (as in the case of web offset heatset inks), it is desirable to incorporate polytetrafluoroethylene wax in the ink composition. Typically, the polytetrafluoroethylene wax will comprise about 40 to 60 wt. % polytetrafluoroethylene particles in a petrolatum base. The polytetrafluoroethylene wax is typically employed in an amount of about 1 to 5 wt. %, based upon the weight of the ink composition.

The vehicle for the printing ink compositions of the present invention refers to that component or mixture of components which serves as a dispersing and carrying medium for the pigment particles of the printing ink and which also imparts appropriate rheological properties such as plasticity, flow, viscosity, etc. the printing ink. The vehicle is typically present in an amount of about 50 to about 95 wt. %, while the pigment is typically present in an amount of about 5 to about 30 wt. %, based on the weight of the composition.

The vehicle will contain 50–100 wt. % of a $C_7$–$C_{40}$, preferably $C_{12}$–$C_{32}$, oil. Suitable oils include mineral oil, soybean oil, linseed oil, cottonseed oil, castor oil, tung oil, canola oil, petroleum distillates, kerosene, toluene, xylene, naphthenes, paraffins, etc. All of the foregoing fluids are well known for use in vehicles for preparing pigment dispersions for printing inks. Depending on the particular type of ink (e.g. news ink, heatset ink, flexographic inks, gravure inks, etc.) desired, the vehicle will also contain conventional amounts of varnishes, rosins, resins, waxes, surfactants, plasticizers, etc.

In the case of conventional news inks, a pigment such as carbon black is embodied in the oil and, if cost permits, a small amount of resin is incorporated to provide some body to the ink. Web offset heatset inks will typically contain a vehicle which in turn contains about 0–50 wt. % of a phenol-modified rosin ester and about 0–50 wt. % of a hydrocarbon resin such as coumarin-indene resins, dicyclopentadiene resins, etc.

For the purpose of the present invention, the pigments are those which are typically employed in printing inks, e.g. Carbon Black, Lithol Red, Red Lake C, BON Red, Lithol Rubine, Naphthol Red, Phthalocyanine Blue, Phthalocyanine Green, Monoarylide and Diarylide Yellows, etc.

The printing ink compositions of the present invention may be prepared by conventional techniques, e.g. by preparing a dispersion of the pigment in the vehicle and thereafter emulsifying the polymer latex in the dispersion using equipment such as a 3-roll mill or shot mill. The preferable procedure for preparing the ink compositions of the present invention is as follows:

(a) the pigment is dispersed in a small amount of vehicle; concurrent with this step, resin may be added, especially typical pigment "grinding" resins;

(b) the dispersion is thereafter diluted further with typical let-down varnishes; if waxes are to be incorporated in the ink compositions, they may be added concurrent with this let-down step;

(c) the diluted dispersion is emulsified with the polymer latex so as to result is a water-in-oil emulsion;

(d) any anti-misting compounds which are desired are added to the emulsion resulting from (c).

A useful web offset heatset printing ink composition comprises:

(a) a dispersion of 5–30 wt. % pigment in 50–95 wt. % of a vehicle containing 30–80 wt. % of a $C_{12}$–$C_{20}$ oil, 0–50 wt. % of a phenol-modified rosin ester and 0–50 wt. % of a hydrocarbon resin;

(b) 1–5 wt. %, based on the weight of the ink composition, of a polytetrafluoroethylene wax incorporated in said dispersion, said wax comprising 40–60 wt. % polytetrafluoroethylene particles in a petrolatum base; and (c) 2–6 wt. % of an aqueous styrene-butadiene copolymer latex containing 30–60 wt. % solids and having a number average molecular weight of 100,000–1,000,000 emulsified in the dispersion resulting from (b).

A useful letterpress news ink comprises:

(a) a dispersion of 5–30 wt. % carbon black in a vehicle containing 50–95 wt. % of a $C_{12}$–$C_{32}$ oil;

(b) 2–6wt. % of an aqueous styrene-butadiene-vinylpyridine terpolymer latex containing 30–60 wt. % solids and having a number average molecular weight of 500,000–10,000,000 emulsified in said dispersion; and (c) 0.1–10 wt. % of a mixture of glyercol and tridecyl acid phosphate incorporated in the emulsion resulting from (b).

A useful web offset news ink composition comprises:

(a) a dispersion of 5–30 wt. % pigment in a vehicle containing 50–95 wt. % of a $C_{12}$–$C_{32}$ oil;

(b) 2–6 wt. % of an aqueous styrene-butadiene-vinylpyridine terpolymer latex containing 30–60 wt. % solids and having a number average molecular weight of 500,000–10,000,000 emulsified in said dispersion; and (c) 0.2–0.5 wt. % of phosphoric acid incorporated in the emulsion resulting (b).

The following examples shall serve to illustrate the benefits achieved by the present invention. Unless otherwise indicated, all parts are by weight.

EXAMPLE 1

A web offset heatset ink was prepared from the following materials:

(a) 62 parts of a varnish consisting of a 50% solids solution ($C_6$–$C_9$ aliphatic oil) of a high molecular weight phenol modified rosin ester having an acid number of about 20 and a melting point of about 160° C.;

(b) 27.5 parts of a pigment flush consisting of about 40 wt. % of phthalocyanine blue pigment in a flushing varnish;

(c) 7.5 parts of a wax consisting of 50 wt. % polytetrafluoroethylene in a petrolatum base;

(d) 3.0 parts of a fluid consisting of 70 wt. % Magie Oil 470 plus 30 wt. % tridecyl alcohol.

The components recited above were mixed at high speed (about 1500 r.p.m.) using a Cowles blade mixer. A second ink was prepared from the same components except that 7.5 parts of a styrene-butadiene copolymer latex were emulsified in the composition after the addition of the polytetrafluoroethylene wax. The styrene to butadiene ratio of the latex was 40:60, and the latex copolymer had a number average molecular weight of about 5,000,000 and contained 40 wt. % solids.

The two inks were printed on identical paper stocks using a Prufbau tester and rubs were conducted on a Sutherland rub tester (this device rubs one printed sheet on a stationary sheet at a constant rate of strokes and at constant force). The first ink showed appreciable rub-off within 4 minutes of rubbing, while the ink containing the latex exhibited rub-off commencing only after 30 minutes of rubbing.

EXAMPLE 2

A letterpress news ink was prepared from the following materials:

(a) 71 parts of 750 S.U.S. mineral oil;

(b) 5 parts of asphaltic wetting agent;

(c) 12 parts of carbon black;

(d) 5 parts of a styrene-butadiene-vinylpyridine terpolymer latex having a monomer ratio of approximately 53:40:7 and a number average molecular weight of several million were emulsified in the composition resulting from the combination of materials (a), (b) and (c);

(e) 5 parts of glyercol and 2 parts of tridecyl acid phosphate were added to the emulsion resulting after incorporation of the styrene-butadiene-vinylpyridine terpolymer latex of (d).

A standard letterpress news ink was prepared without components (d) and (e). The ink formulated above as compared to the standard was evaluated in the same manner as described in Example 1. The ink containing components (d) and (e) exhibited on 80% rub reduction as compared to the standard.

EXAMPLE 3

A web offset newspaper ink was prepared from the following materials:
(a) 30 parts of 2400 S.U.S. mineral oil;
(b) 30 parts of 750 S.U.S. mineral oil;
(c) 2 parts of asphaltic wetting agent;
(d) 3 parts linseed oil;
(e) 19 parts of carbon black;
(f) 3 parts of H.P. 60 (a $C_{16}$–$C_{20}$ oil having a boiling point in excess of 300° C.);
(g) 18 parts of a low molecular weight aromatic hydrocarbon resin;
(h) 3 parts of the same styrene-butadiene-vinylpyridine terpolymer latex as employed in Example 2 were emulsified in the composition resulting from the addition of materials (a)–(g);
(i) 2 parts tridecyl acid phosphate were added to the emulsion resulting after incorporation of the styrene-butadiene-vinylpyridine terpolymer latex of (h).

A standard web offset newspaper ink was formulated from the same material as above but without components (h) and (i) and a comparative evaluation of the two inks was made in the same manner as described in Example 1. The ink containing components (h) and (i) exhibited a 90% improvement in rub reduction as compared to the standard web offset newspaper ink.

What is claimed is:

1. A printing ink composition comprising:
   (a) a dispersion of about 5 to 30 wt. %, based on the weight of the composition, of a pigment in about 50 to about 95 wt. %, based on the weight of the composition, of a vehicle containing 50–100 wt. % of a $C_7$–$C_{40}$ oil; and
   (b) about 0.5 to about 15 wt. %, based on the weight of the composition, of a polymer latex emulsified in said dispersion, said polymer latex being an aqueous suspension containing about 30 to about 60 wt. % polymer solids, based on the weight of the latex, said polymer having a number average molecular weight of about 50,000 to about 10,000,000.

2. The composition of claim 1 wherein the polymer latex is selected from the group consisting of latices of styrene-butadiene copolymer, styrene-butadiene-vinylpyridine terpolymer, styrene-butadiene-acrylonitrile terpolymer, polytetrafluoroethylene, polyethylene, polyurethane, polyvinyl acetate, polystyrene, vinyltoluene-butadiene copolymer, butadiene-acrylonitrile copolymer, styrene-acrylic acid copolymer, carboxylated styrene-butadiene copolymer, vinylpyrrolidone-vinyl acetate copolymer, vinylpyrrolidone-ethyl acrylate copolymer, vinypyrrolidone-styrene copolymer, and polyvinylidene chloride.

3. The composition of claim 2 wherein the polymer latex comprises styrene-butadiene copolymer latex.

4. The composition of claim 2 wherein the polymer latex comprises styrene-butadiene-vinylpyridine terpolymer latex.

5. The composition of claim 2 wherein the polymer latex comprises polytetrafluoroethylene latex.

6. The composition of claim 1 including a compound selected from the group consisting of (a) an organic acid phosphate ester of a monohydric alcohol, (b) glyercol, (c) propylene carbonate and mixtures thereof.

7. The composition of claim 6 wherein the compound is present in an amount of about 0.1 to about 10 wt. %, based on the weight of the composition.

8. The composition of claim 6 wherein the organic phosphate ester comprises an organic acid phosphate ester of a monohydric alcohol.

9. The composition of claim 8 wherein the organic group of the ester is a straight or branched chain alkyl, aryl, alkaryl, aralkyl or heterocyclic group containing 2 to 18 carbon atoms.

10. The composition of claim 9 wherein the organic group is a straight chain alkyl group containing 8 to 15 carbon atoms.

11. The composition of claim 10 wherein the ester comprises tridecyl acid phosphate.

12. The composition of claim 6 wherein the compound comprises glycerol.

13. The composition of claim 1 including polytetrafluoroethylene wax.

14. The composition of claim 13 wherein the polytetrafluoroethylene wax comprises about 40 to 60 wt. % polytetrafluoroethylene particles in a petrolatum base.

15. The composition of claim 13 wherein the polytetrafluoroethylene wax is present in an amount of about 1 to 5 wt. %, based on the weight of the composition.

16. The composition of claim 1 including phosphoric acid.

17. The composition of claim 16 wherein the phosphoric acid is present in an amount of about 0.1 to about 1 wt. %, based on the weight of the composition.

18. The composition of claim 1 wherein the vehicle contains about 20 to 50 wt. % of a phenol-modified rosin ester, based on the weight of the vehicle.

19. A web offset heatset printing ink composition comprising:
   (a) a dispersion of 5–30 wt. % pigment in 50–95 wt. % of a vehicle containing 30–80 wt. % of a $C_{12}$–$C_{20}$ oil, 0–50 wt. % of a phenol-modified rosin ester and 0–50 wt. % of a hydrocarbon resin;
   (b) 1–5 wt. %, based on the weight of the ink composition, of a polytetrafluoroethylene wax incorporated in said dispersion, said wax comprising 40–60 wt., % polytetrafluoroethylene particles in a petrolatum base; and
   (c) 2–6 wt. % of an aqueous styrene-butadiene copolymer latex containing 30–60 wt. % solids and having a number average molecular weight of 100,000–1,000,000 emulsified in the dispersion resulting from (b).

20. A letterpress news ink composition comprising:
   (a) a dispersion of 5–30 wt. % carbon black in a vehicle containing 50–95 wt. % of a $C_{12}$–$C_{32}$ oil;
   (b) 2–6 wt. % of an aqueous styrene-butadiene-vinylpyridine terpolymer latex containing 30–60 wt. % solids and having a number average molecular weight of 500,000–10,000,000 emulsified in said dispersion; and
   (c) 0.1–10 wt. % of a mixture of glyercol and tridecyl acid phosphate incorporated in the emulsion resulting from (b).

21. A web offset news ink composition comprising:
   (a) a dispersion of 5–30 wt. % pigment in a vehicle containing 50–95 wt. % of a $C_{12}$–$C_{32}$ oil;
   (b) 2–6 wt. % of an aqueous styrene-butadiene-vinylpyridine terpolymer latex containing 30–60 wt. % solids and having a number average molecular weight of 500,000–10,000,000 emulsified in said dispersion; and
   (c) 0.2–0.5 wt. % of phosphoric acid incorporated in the emulsion resulting from (b).

* * * * *